Sidney G. Parker
INVENTOR

United States Patent Office 3,453,148
Patented July 1, 1969

3,453,148
METHOD OF MAKING AN ELECTRODE FOR A FUEL CELL
Sidney G. Parker, Dallas, Tex., assignor to Texas Instruments Incorporated, Dallas, Tex., a corporation of Delaware
Filed June 29, 1965, Ser. No. 467,976
Int. Cl. H01m *13/08, 21/04*
U.S. Cl. 136—120      3 Claims

ABSTRACT OF THE DISCLOSURE

Disclosed are a fuel cell element and method of making the same. The fuel cell element is preferably made by coating a portion of a porous nonconductive disc with silver metal, placing a mixture of metals and oxides of metals and a burn-out filler into a mold under pressure and in contact with the silver coated area, and sintering the mixture at a temperature of about 850° C. to 950° C. in an inert gas for about 1 to 2 hours.

---

This invention relates to fuel cell electrodes and more particularly to porous electrodes for high temperature fuel cells and the method of making such electrodes.

One of the key problems in making good fuel cells for high temperature operation is to provide highly efficient oxidant and fuel electrodes which can withstand the operating environment without harmful polarization and loss of efficiency.

It is therefore an object of the invention to provide porous electrodes for fuel cells as an integral part of the electrolytic carrier.

It is another object of the invention to provide porous oxidant and fuel electrodes for fuel cells of controlled pore density made of materials and oxides of materials as an integral part of the electrolyte carrier.

It is a further object of the invention to provide porous oxidant and fuel electrodes formed from materials and oxides of materials, sintered together to form an integral part of a magnesium-oxide molten electrolyte carrier.

It is still another object of the invention to provide a method of making oxidant and fuel electrodes of controlled pore density, wherein metals and oxides of metals are sintered in a predetermined pattern onto an electrolyte carrier to form an integral part thereof.

It is still another object of the invention to provide a method of making oxidant and fuel electrodes for fuel cells wherein magnesium-oxide electrolyte carriers are sprayed with silver in a predetermined pattern, and a mixture of metals and oxides of metals are molded over the silver pattern and sintered to form an integral part of the electrolyte carrier.

Other objects and features of the invention will become more readily understood from the following detailed description and appended claims when read in conjunction with the accompanying drawings wherein:

In the invention, porous oxidant and fuel electrodes are made by coating a porous disc with silver metal. Metals and oxides of metals are powdered and blended together and then poured into a mold placed around the silver pattern on the porous disc. The particles of the metals and oxides of metals are chosen in size to produce pores in the electrodes. A tab is inserted into the powdered material to provide an electrode contact. The metals and oxides of metals are sintered to form an adherent porous electrode matrix having a controlled pore density. The pore density may be varied by changing the particle sizes of the metals and oxides of metals. The pore density may also be varied by using a burn-out material within the mixture which is later burned out during sintering to increase the porosity of the electrode.

Figure 1:
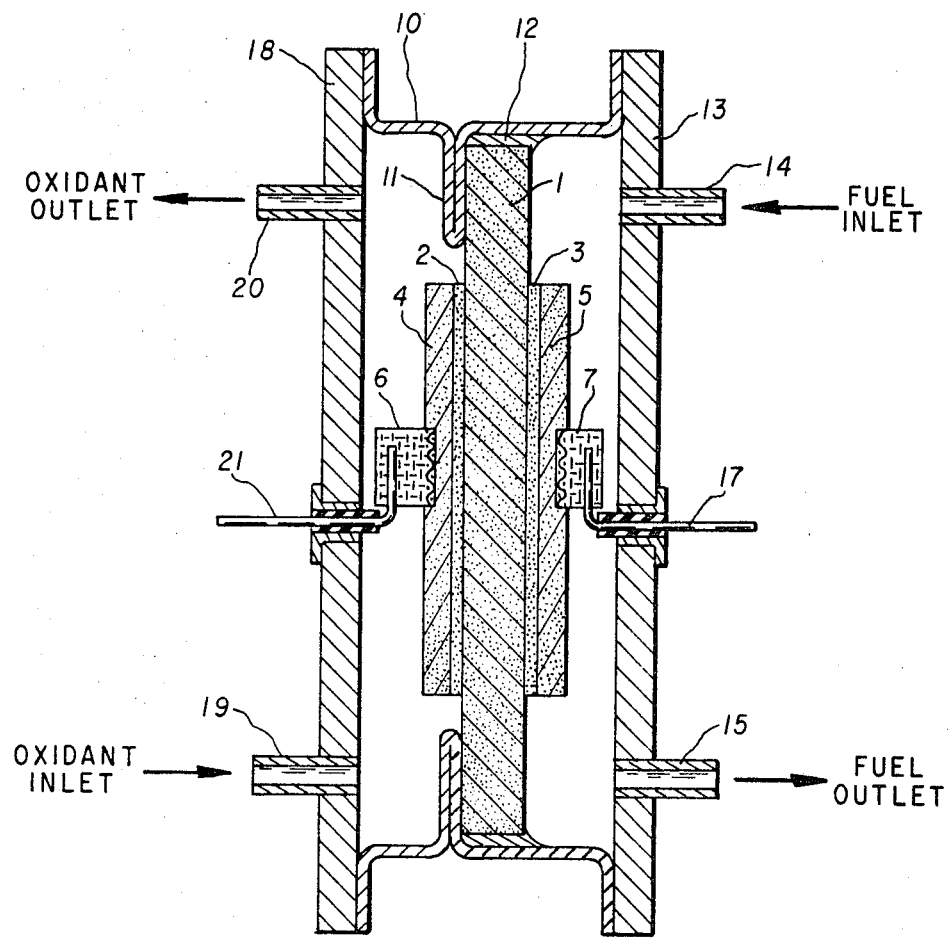
FIGURE 1 illustrates a cross-sectional view of a fuel cell having an electrolyte carrier with integral oxidant and fuel electrodes formed thereon, and sealed in a circular container.

Referring to FIGURE 1, there is shown a cross-sectional view of a fuel cell generally circular in shape, the cross-section of which is taken along the diameter of the cell. The electrolyte carrier 1, which is preferably magnesium-oxide, is circular in shape and has a porous metallic silver layer 2 on one side, and a second porous metallic silver layer 3 on the other side. Against the silver layer 2 is a porous oxidant electrode 4 having a contact tab 6 imbedded therein. Against silver layer 3 is porous fuel electrode 5 having contact tab 7 imbedded therein. Electrodes 4 and 5 are mixtures of metals and oxides of metals, for example, vanadium, nickel, silver and oxides thereof. Tabs 6 and 7 may be either of metal or screen material.

The fuel cell as illustrated is contained in a circular housing or body 10 which has an inwardly projecting shoulder 11. The electrolyte carrier 1 is placed against shoulder 11 and held thereagainst by sealant 12.

Secured to body 10 on the fuel electrode side is a cap 13 having a fuel inlet 14 and a fuel outlet 15. Cap 13 also has an insulating electrical lead-through 17 attached to contact 7. Cap 13 is welded to body 10 after electrical contact is made between contacts 7 and lead-through 17.

On the oxidant electrode side of body 10 there is secured thereto a cap 18 having an oxidant inlet 19 and outlet 20. Cap 18 also has insulated electrical lead-through 21 attached to contact 6. Cap 18 is welded to body 10 after electrical contact is made between contact 6 and lead-through 21.

In operation, oxidant and gas is introduced into one side of the fuel cell housing 10 through inlet 19 coming in contact concurrently with electrode 4 and the electrolyte in carrier 1 and at the same time, fuel gas is introduced into the other side of the cell housing through inlet 14 coming in contact concurrently with electrode 5 and the electrolyte in carrier 1. The fuel cell electrical potential is taken across insulated electrical lead-throughs 17 and 21 attached to contacts 7 and 6.

Figure 2:
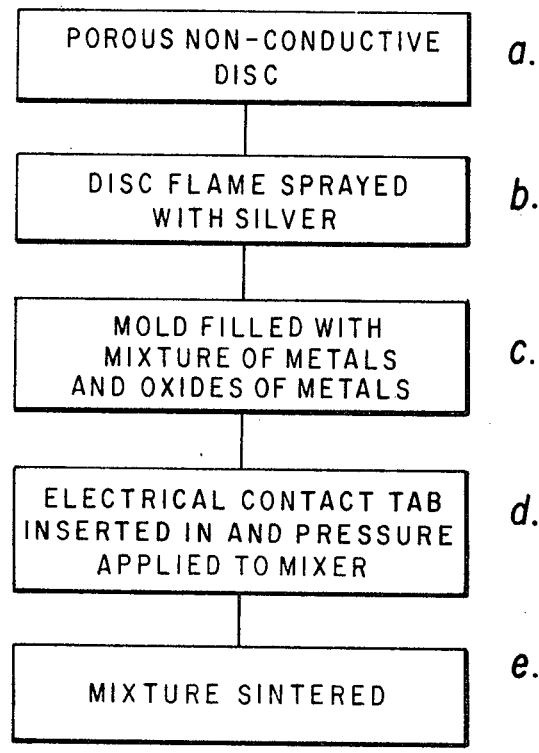
FIGURE 2 shows in blocks (a) through (e) the various stages in the method of making the electrodes and attaching them to the electrolyte carrier.

In FIGURE 2, blocks *a* through *e* are representative of the successive steps of the method for making electrodes 4 and 5. As shown in block *a*, a porous nonconductive disc is used which is suitable for retaining a molten electrolyte such as sodium lithium carbonate, for example. The disc is flame sprayed with silver metal in an area suitable for making electrodes as indicated in block *b*. In the spraying operation, a suitable porous layer of silver is laid in intimate contact with the surface of the disc. A suitable mold, as indicated in block *c*, is placed around the layer of silver. An aluminum ring or shallow cylinder, for example, may be used for the mold. A mixture of metals and oxides of metals, for example vanadium, nickel and silver and the oxides thereof, ground to desired particle sizes, are blended and poured into the mold.

Next, an electrical contact tab is inserted into the mixture. The electrode area is placed under uniform pressure of about 1 to 2 pounds per square inch as shown in block *d* of FIGURE 2. The assembly is then sintered (block *e*) at about 850° to 900° C. in an inert atmosphere for about one to two hours. The pressure maintains constant contact between the particles in the mixture and prevents lateral shrinkage of the electrodes during the sintering operation.

The mixture of the metals and the oxides of metals contains 25% to 99% silver by weight. The mixture of metals and oxides of metals of desired particle size may be formed by co-precipitation of silver and oxides of metals. Thermal decomposition of silver nitrates and the nitrates of various elements may be used to provide mixtures of silver and the element oxides.

In the process described, the pore diameter was approximately 1/16 the particle diameter. Burn-out material, for example, $NH_4(HCO_3)$, ammonia bicarbonate, may be added to the electrode mixtures to increase the porosity. The material adds to the bulk of the mixture and is burned out during the sintering operation, increasing the porosity of the electrodes.

Although the present invention has been shown and illustrated in terms of a specific preferred embodiment and to a method for making said embodiment, it will be apparent that changes and modifications are possible without departing from the spirit and scope of the invention as defined in the appended claims.

What is claimed is:

1. The method of making a porous fuel cell electrode comprising the steps of coating a porous disc with a metal onto a preselected area of said porous disc, placing a mold around the metal coating, placing a mixture of metals and oxides of metals into the mold, inserting a contact tab into the mixture and exerting a uniform pressure on the mixture and sintering for about 1 to 2 hours.

2. The method of making porous electrodes as an integral part of the electrolytic carrier in a fuel cell, comprising the steps of coating a porous electrically non-conductive disc having two major faces with silver in predetermined patterns on each of said major faces, placing a mold around the silver coating on each of said major faces, filling said mold with a mixture of metals and oxides of metals, subjecting said mixture to a pressure of 1 to 2 pounds per square inch, and sintering at a temperature of about 850° C. to 900° C. in an inert gas for 1 to 2 hours.

3. The method of making a fuel cell electrode comprising the steps of flame spraying an area of a porous non-conductive disc with silver metal, placing a mold around said sprayed area, filling said mold with the mixture of metals and oxides of metals containing 25–99% silver by weight, inserting a contact tab into said mixture, applying a pressure of 1 to 2 pounds per square inch to said mixture, and sintering said mixture for about 1 to 2 hours at about 850–900° C. in an inert gas.

References Cited

UNITED STATES PATENTS

| | | | |
|---|---|---|---|
| 2,276,188 | 3/1942 | Greger | 136—86 |
| 3,068,311 | 12/1962 | Chambers et al. | 136—86 |
| 3,318,730 | 5/1967 | Kreiselmaier. | |
| 2,708,683 | 5/1955 | Eisen | 136—120.1 |
| 3,248,214 | 4/1966 | Kroeger et al. | 136—86 X |
| 3,266,939 | 8/1966 | Adam et al. | 136—86 |
| 3,268,365 | 8/1966 | McQuade et al. | 136—86 |
| 3,300,344 | 1/1967 | Bray et al. | 136—86 |

FOREIGN PATENTS

| | | |
|---|---|---|
| 875,977 | 8/1961 | Great Britain. |
| 980,300 | 1/1965 | Great Britain. |

ALLEN B. CURTIS, *Primary Examiner.*

U.S. Cl. X.R.

75—212, 224; 136—86